US006199300B1

(12) United States Patent
Heater et al.

(10) Patent No.: US 6,199,300 B1
(45) Date of Patent: Mar. 13, 2001

(54) METHOD FOR ENERGY EFFICIENT CONTROL OF A DRYER OF CLOTHES

(75) Inventors: Timothy E. Heater, Hartford; Shawn Richard Oltz, Niles; Gregory J. Markert, St. Joseph, all of MI (US); Mark F. Kendall, South Bend, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 09/516,616

(22) Filed: Mar. 1, 2000

(51) Int. Cl.$^7$ .................................................. F26B 3/00
(52) U.S. Cl. ...................... 34/446; 34/486; 34/496; 34/499
(58) Field of Search ................. 34/445, 446, 486, 34/493, 496, 498, 499, 549, 557, 558, 562, 565, 569, 595, 604, 606; 307/650, 651, 652; 236/44 C, 47

(56) References Cited

U.S. PATENT DOCUMENTS

| 3,621,202 | 11/1971 | Gemert ................................ 219/492 |
| 3,942,265 | * 3/1976 | Sisler et al. ............................ 34/527 |
| 4,019,259 | * 4/1977 | Veraart ................................... 34/550 |
| 4,231,166 | * 11/1980 | McMillan ................................ 34/553 |
| 4,397,101 | * 8/1983 | Rickard ................................... 34/486 |
| 4,622,759 | 11/1986 | Abe et al. ................................. 34/44 |
| 4,827,627 | * 5/1989 | Cardoso ................................... 34/526 |
| 4,991,313 | 2/1991 | Joslin ..................................... 34/48 |
| 5,245,764 | 9/1993 | Sung ...................................... 34/48 |
| 5,291,667 | 3/1994 | Joslin et al. ............................. 34/44 |
| 5,347,727 | * 9/1994 | Kim ...................................... 34/578 |
| 5,443,541 | 8/1995 | St. Louis ............................... 34/486 |
| 5,444,924 | 8/1995 | Joslin et al. ............................ 34/486 |
| 6,047,486 | * 4/2000 | Reck et al. ............................. 34/491 |

FOREIGN PATENT DOCUMENTS

| 106646 | 4/1984 | (EP) | ................................ D06F/58/28 |
| 481561 | 10/1991 | (EP) | ................................ D06F/58/28 |
| 436374 | 8/1996 | (EP) | ................................ D06F/58/28 |

* cited by examiner

Primary Examiner—Stephen Gravini
(74) Attorney, Agent, or Firm—Thomas J. Roth; Robert O. Rice; Joel M. Van Winkle (57) ABSTRACT

A method and apparatus for controlling the heat input of a dryer where the initial heat input to a clothes load is set at full power until a first predetermined temperature or time condition occurs. The heat input of the dryer is then reduced to in order to reduce power consumption while effectively removing moisture from the clothes load. When the moisture content of the clothes load falls below a predetermined amount, full heat input is once again applied to remove remaining moisture in the clothes load.

12 Claims, 8 Drawing Sheets

METHOD FOR ENERGY EFFICIENT CONTROL OF A DRYER OF CLOTHES

BACKGROUND OF THE PRESENT INVENTION

The present invention relates to a method and apparatus for controlling the heat input to a dryer and, more specifically, to controlling the heat input in an energy efficient manner.

Typically in dryers known in the art, full heating energy is applied to a clothes treatment chamber throughout a drying cycle up to a point in time when the moisture content of the clothes is reduced below a threshold level. At this point or a predetermined time period thereafter, the drying energy is terminated and the drum of the dryer continues to rotate for a predetermined amount of time to allow cooling of the clothes treatment chamber. When a sufficient time to allow cooling or after a cool down temperature has been reached, the dryer is then shut-off. Alternatively, it is also known in the art to simply maintain an exhaust temperature of the dryer at a set temperature level after an initial period of heating from the start of the drying cycle for a predetermined time period.

However, it has been discovered by the Applicants that efficient drying of clothes (i.e., moisture reduction) does not necessarily require that the power level of the heating element or the exhaust temperature of the dryer be maintained at a set level. Rather, the Applicants have found through testing that moisture retention of clothing within the dryer declines at a relatively constant rate even when the applied heating energy or the exhaust temperature is reduced after an initial full energy heating period of approximately 5 to 30 minutes at the start of the cycle. Accordingly, dryers known in the art that maintain a set power level or exhaust temperature are not energy efficient since full energy or exhaust temperature is not necessary to reduce moisture at a constant rate.

Thus, there is a need for an energy efficient control of drying energy that benefits from the discovery of effective moisture reduction at a constant rate with less than maximum drying energy or exhaust temperature.

SUMMARY OF THE PRESENT INVENTION

The above need and other needs are met by the present invention that provides a method and apparatus for controlling the level of drying energy applied to the clothes treatment chamber in a dryer at varying levels during different periods in the drying cycle in order to reduce total energy consumption.

According to one aspect of the invention, a methodology is provided for controlling heat input to a dryer including setting the heat input to a first prescribed level at a start of the drying cycle. Next, the dryer temperature and load moisture level are monitored and the heat input is reduced to a second prescribed level when is the dryer temperature reaches a substantially non-varying temperature level. The heat input is increased to a third prescribed level when the dryer load moisture level is detected as falling below a predetermined dryer load moisture level. The heat input to the dryer is terminated according to one of a number of predetermined termination conditions. These termination conditions may include one or more of monitoring the dryer temperature and terminating drying when the temperature exceeds a prescribed level, determining when a rate of increase of temperature with respect to time exceeds a prescribed level, monitoring the total time of the drying cycle and terminating heat input when a maximum time limit is exceeded or determining when an arbitrary temperature set by an operator has been exceeded and terminating drying when the temperature is exceeded. This method is advantageous in that it reduces power consumption from the time of initial heating to the point at which the load moisture level of the clothes falls below a predetermined level. This is also advantageous in that the clothes load is not overheated.

According to another aspect of the present invention, an apparatus for controlling a dryer is provided for a dryer having a heating element for delivering heat input to the dryer. The control apparatus includes at least one heat sensor for sensing the exhaust temperature of the dryer and at least one load moisture sensor to sense the load moisture level of the dryer. A controller receives inputs of exhaust temperature from the heat sensor and moisture level from the load moisture sensor and outputs a first control signal to set a power level of the heating element to a first prescribed level at the start of a drying cycle. The controller also monitors the dryer temperature and dryer load moisture level and outputs a second control signal to reduce the power level of the heating element to a second prescribed level when the dryer temperature reaches a substantially non-varying temperature level. A third control signal is output from the controller to increase the power level of the heating element to a third prescribed level when the dryer load moisture level falls below a predetermined level. Finally, the controller terminates power input to the heating element or gas burner according to at least one of a plurality of predetermined termination conditions.

Additional advantages and novel features of the invention will be set forth, in part, in the description that follows and, in part, will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designation represent like elements throughout and wherein.

DETAILED DESCRIPTION OF THE PREFERRED EMBODIMENTS

Figure 1:
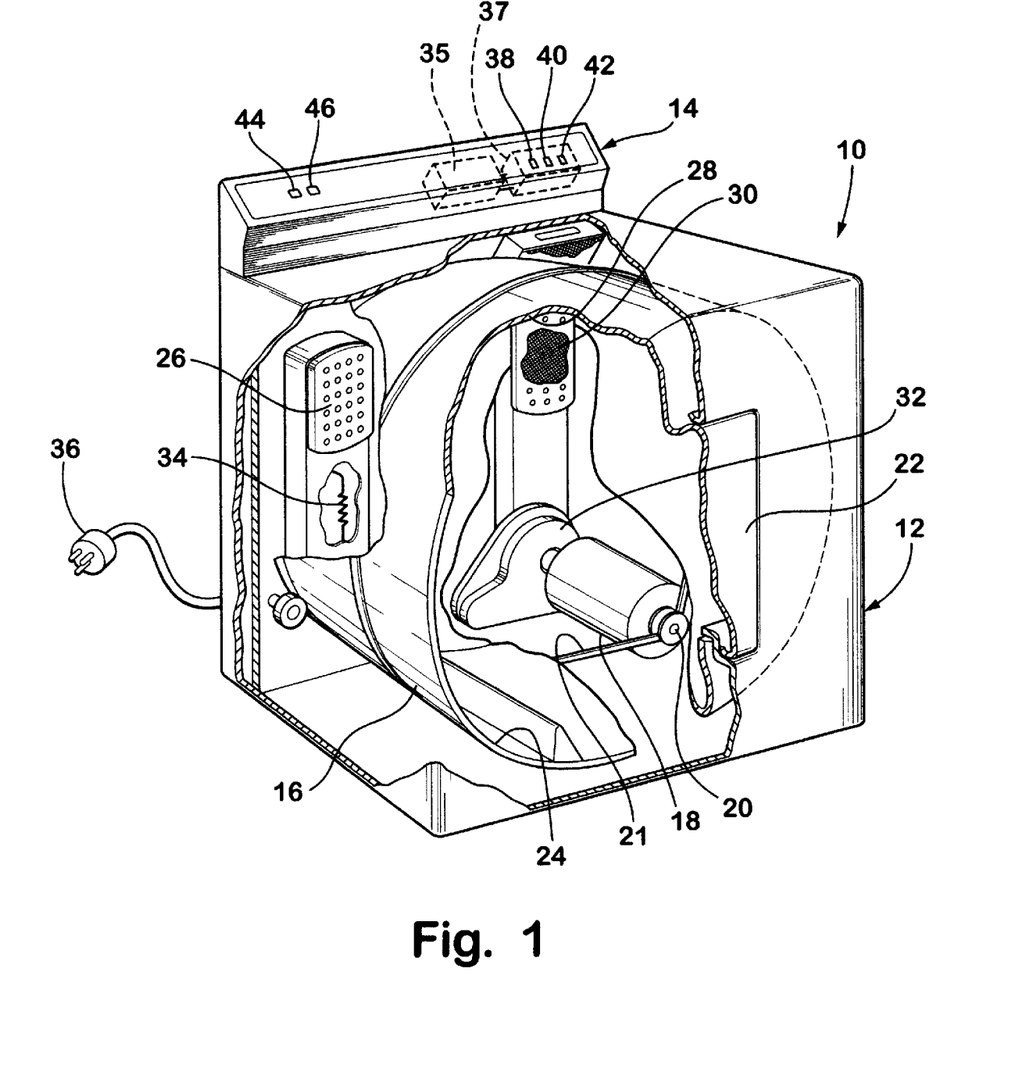
FIG. 1 is a partly cut away perspective view of a clothes dryer employing the heating control of the present invention.
Figure 2:
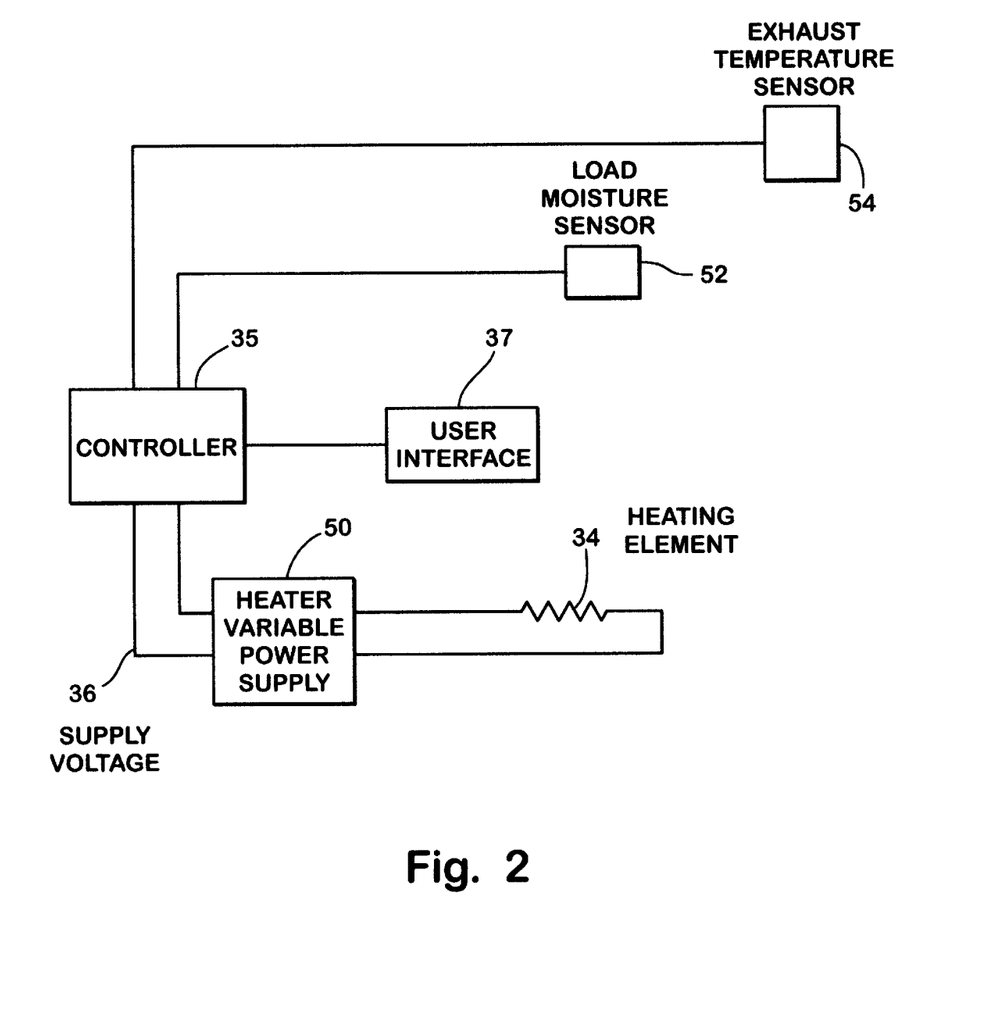
FIG. 2 is a block diagram of the control apparatus according to an embodiment of the present invention.

Referring to FIG. 1 of the drawings, an exemplary automatic clothes dryer 10 is illustrated that is controlled with the control apparatus shown in FIG. 2. Specifically in FIG. 1, the mechanical components of the clothes dryer are well known in the art and are, therefore, not shown in great detail.

The clothes dryer 10 has a cabinet 12 including a control console 14. Within the cabinet 12 is rotatably mounted a drum 16 that is rotatably driven about a horizontal axis by a motor 18 through a drive system 20, typically including a belt 21. A front door 22 formed in the front of the cabinet 12 provides selective access to the clothes treatment chamber 24 defined by the interior of the drum 16.

The drum 16 is provided with an inlet aperture 26 and an outlet exhaust aperture 28 having a removable lint screen 30. A supply of air is circulated by a fan 32 driven by the motor 18. A heating element 34 is selectively energized for example by a heater variable power supply 50, shown in FIG. 2, that is controlled by a controller 35 within the control console 14, for example. As is well known in the art, supply of temperature control air is circulated by the fan 32 past the heating element 34 through the inlet aperture 26 into the clothes treatment chamber 24 within the drum 16 and subsequently output through the outlet exhaust aperture 28 including the lint screen 30. Although FIG. 1 illustrates the inlet and outlet apertures 26 and 28, as well as the heating element 34, disposed on a back portion of the dryer 10, it will be appreciated by those skilled in the art that the apertures and heating element could be located on the front portion of the dryer 10, for example.

The control console 14 includes a user interface 37 having, for example, a start button 38, a dryness selector 40 and a temperature selector 42 to permit the user to start a drying cycle, as well as select the parameters of the drying cycle. In the preferred embodiment, the dryness selector 40 permits selection between "damp dry", "normal dry" and "more dry" settings and the temperature selector 42 permits selection of certain temperature level settings. Further, the user interface 37 may also include means to allow a user to set time settings (not shown) such as the period of time in which the dryer is allowed to operate.

FIG. 1 also illustrates that a controller 35 for controlling the drying cycle operation may be located within the control console 14. The controller 35 receives inputs from an exhaust temperature sensor 54 and a load moisture sensor 52 as shown in FIG. 2. The exhaust temperature sensor 54 may comprise a thermistor or any other temperature sensing device known in the art. The load moisture sensor may comprise resistance strips or any other load moisture or humidity measuring devices known in the art. Furthermore, the present invention may either measure the actual humidity level of the dryer exhaust, such as via a capacitive humidity sensor, or simply the wetness of the clothes load, such as by sensing the frequency of resistance variations in resistance strips located within the clothes treatment chamber 24, thereby indicating wetness and correlating that frequency to moisture level. For purposes of this application, sensing of the dryer load moisture level may be either by determining the actual humidity of the dryer exhaust or sensing wetness in the clothes treatment chamber 24.

Additionally, the controller 35 receives inputs from the user interface 37 to set and change variables used in the control operation. The controller 35 also outputs a signal to a heater variable power supply 50 that varies the output of the power supply 50 delivered to the heating element 34. Typically, the heater power supply 50 is supplied with power from a 208 V.A.C. or 240 V.A.C. power source by means of an input power supply 36, such as via a three-wire pigtail.

Figure 3:
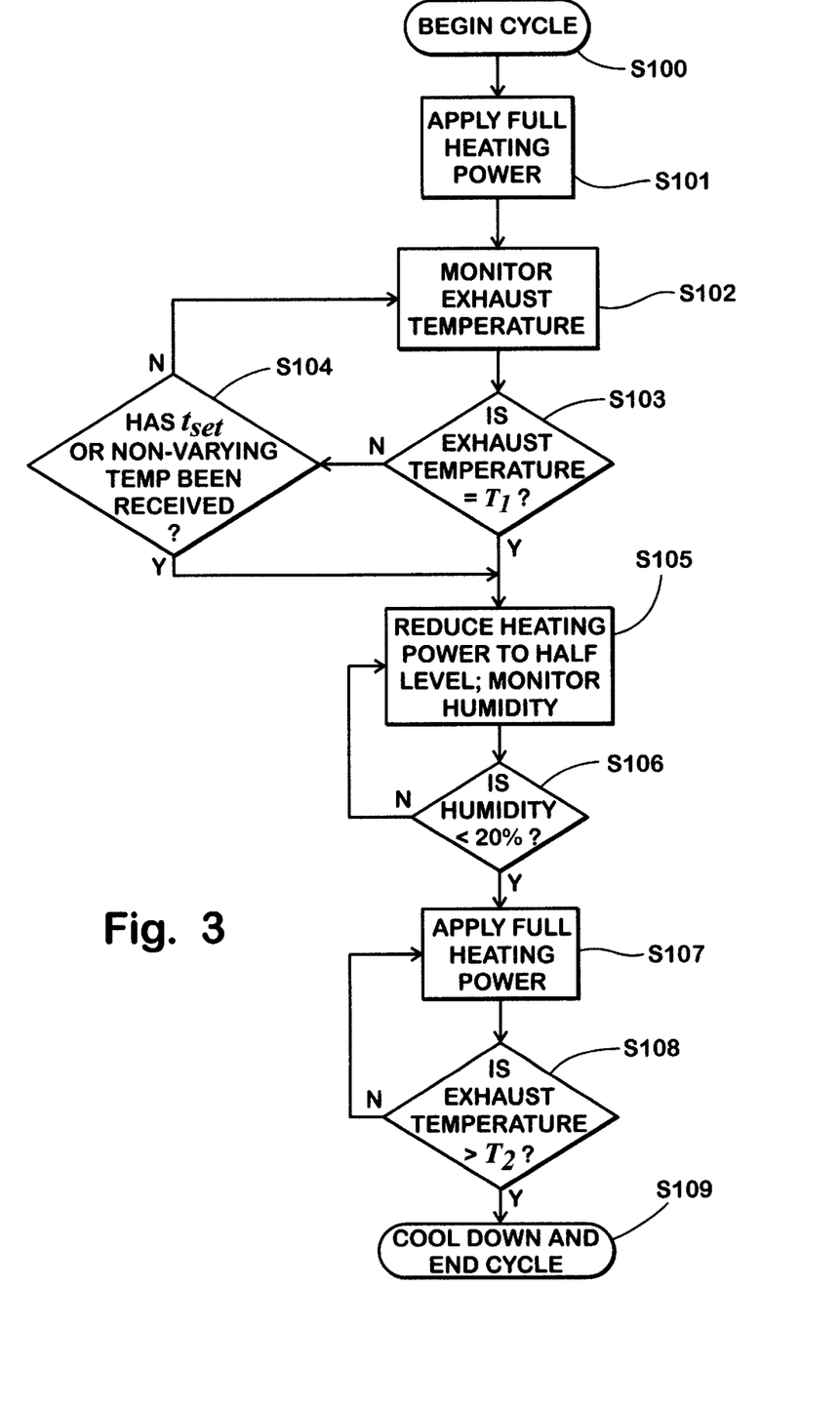
FIG. 3 is a flow diagram illustrating the steps of dryer control according to an embodiment of the present invention.
Figure 4:
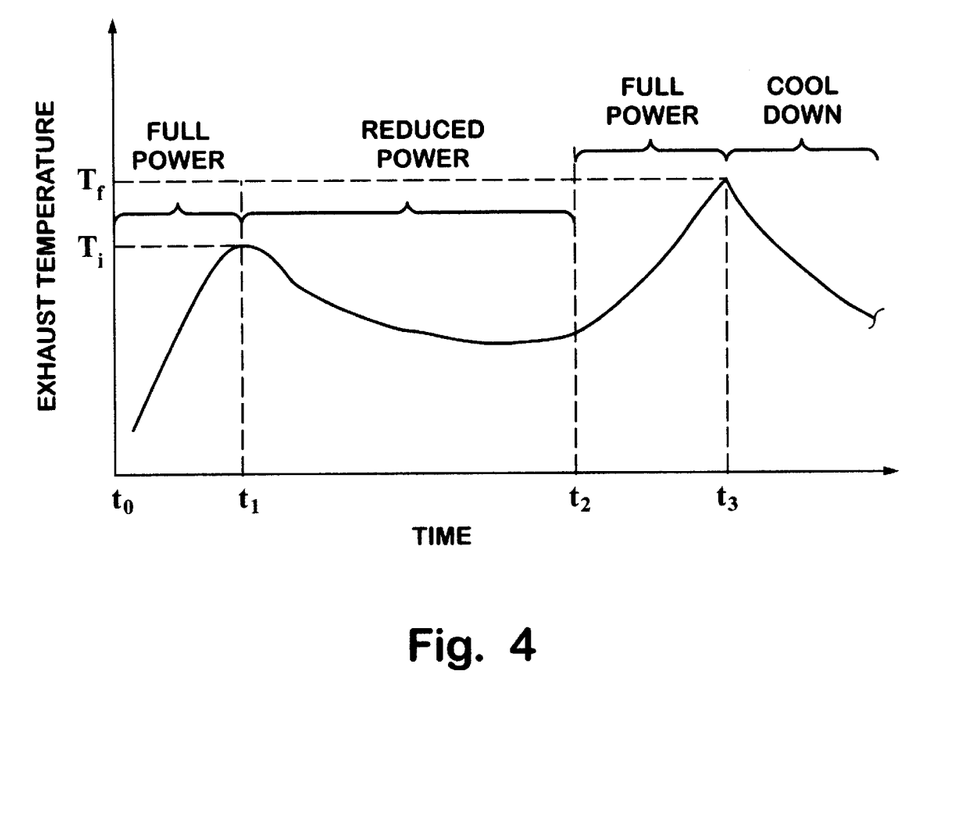
FIG. 4 is a graphical illustration of the exhaust temperature with respect to time for a drying cycle of the dryer according to an embodiment of the present invention.

FIG. 3 illustrates the method by which the controller 35 controls the heating during the drying cycle in a preferred embodiment of the present invention. When a drying cycle is started in step S100 the controller 35 directs the heater variable power supply 50 to apply full heating power to the heating element 34 as shown in step S101. Illustrative of the exhaust temperature being monitored by exhaust temperature sensor 54, FIG. 4 shows in the time period between $t_0$ and $t_1$ the application of full heating power and the consequent rise in the exhaust temperature of the dryer. During this time period the exhaust temperature is monitored in step S102 and repeatedly compared against a safety temperature $T_1$ that is not to be exceeded. If the exhaust temperature is below the safety temperature $T_1$, the controller 35 then determines whether a set time period $t_{set}$ or a non-varying temperature has been reached in step S104. Preferably, the set time period $t_{set}$ is 10 minutes, but may be varied by input from the user interface 37. With respect to the non-varying temperature, this condition is a steady state exhaust temperature that is determined by monitoring the exhaust temperature consecutively for a predetermined amount of time and sensing whether the temperature lies within a specified temperature range.

If a steady state is detected or the set time period has been reached, the flow proceeds to step S105. Otherwise, flow proceeds back to step S102 where the exhaust temperature continues to be monitored until either of the conditions in step S104 are met or the exhaust temperature has exceeded the safety temperature $T_1$ as determined in step S103. Thus, the initial heating period from $t_0$ to $t_1$ brings the temperature up to a temperature $T_i$ shown in FIG. 4. This temperature $T_i$ may be $T_1$ in the case where the temperature $T_1$ has been reduced prior to meeting either of the conditions of step S104. Alternatively, if either of the conditions of step S104 are met prior to reaching temperature $T_1$, the temperature $T_i$ will be some value less than $T_1$. In addition, time $t_1$ shown in FIG. 4 may be representative of the set time period $t_{set}$ if neither the temperature $T_1$ has been reached nor a steady state temperature has been achieved. Otherwise, $t_1$ will be a time less than the set time period $t_{set}$.

In step S105, the heating power applied to the heating element 34 is reduced by the controller 35 by the variable power supply 50 to a half power level. Alternatively, power may be reduced to a quarter power level or some other predetermined power level less than full power. Preferably, the power output of the heating element 34 can be accomplished by utilizing a dual wattage type heating element and using a relay (not shown) in the power supply 50 to switch the heating element to the lower wattage (e.g., half wattage). Alternatively, the relay could be used to change the voltage of a typical 240 V heating element to 120 V by switching one of the 120 V lines to neutral. In addition, the input from the load moisture sensor 52, which detects moisture of the exhaust or of the clothing, is continually monitored to ascertain the moisture content of the clothes load within the dryer. During this period of power reduction, the moisture content of the clothes load is reduced in a fairly linear fashion with respect to time, yet with reduced energy consumption. FIG. 4 illustrates this time period between time $t_1$ and $t_2$. In step S106 the load moisture level is compared to determine whether the level is below a predetermined level, such as 20%. If the load moisture level is above 20%, the flow cycles back to step S105 where the load moisture level is continued to be monitored. At about 20% load moisture level, known moisture detectors such as resistance strips can no longer effectively detect moisture to determine whether a clothes load is indeed dry. Accordingly, when the load moisture drops below this level the controller 35 signals the variable power supply 50 to again apply full heating power in step S107 in order to ensure complete drying of the clothes load. FIG. 4 illustrates the reapplication of full power from time period $t_2$ to $t_3$.

In the embodiment shown in FIG. 3, the exhaust temperature is continuously monitored after the application of full heating power in step S107 to determine whether the exhaust temperature exceeds a predetermined maximum trip temperature $T_2$ as shown in step S108. When the maximum trip temperature $T_2$ is exceeded, the controller shuts off all power to the heating element 34 to start a cool down portion of the drying cycle. As an example of this heating termination condition, FIG. 4 illustrates termination of full power heating at time $t_3$ corresponding to exhaust temperature $T_f$, which may be representative of the temperature $T_2$ in this example. After the cool down period, the drying cycle is ended as shown in step S109.

Although the termination condition for the heat input in step S108 is shown to terminate when an exhaust temperature exceeds a predetermined trip temperature level $T_2$, other termination control algorithms could be contemplated by one of ordinary skill in the art. For example, a contemplated termination condition may consist of allowing a user to input, via the user interface 37, a maximum run time from either the start of the run cycle (e.g., time $t_0$) or from another point in time during the drying cycle, such as $t_2$ shown in FIG. 4 when full power heating is once again applied.

A further termination condition contemplated may consist of monitoring the slope of the curve of the exhaust temperature with respect to time during the time period after the resumption of full power heating (e.g., the time period of $t_2$ to $t_3$ as shown in FIG. 4). During this time period, when the slope of the exhaust temperature with respect to time exceeds a predetermined slope, the controller 35 will terminate the application of full power heating and the drying cycle will then proceed to the cool down and end cycle.

Yet another termination condition contemplated may consist of terminating full power heating when the exhaust temperature reaches a maximum temperature setting input by an operator via the user interface 37 (e.g., this maximum temperature corresponds to $T_f$ in FIG. 4 for this example).

According to another embodiment of the present invention, FIGS. 5A through 5D illustrate a preferred method of controlling dryer heating wherein an operator may select between multiple drying criteria. Specifically, after a drying cycle has begun at step S200 in FIG. 5A, an operator may select one of three cycles in step S201. These three cycles consist of "more dry" in step S202, "normal dry" in step S203 and "damp dry" in step S204. If "more dry" is selected flow proceeds to the cycle shown in FIG. 5B as denoted by the letter "A".

Figure 5A:
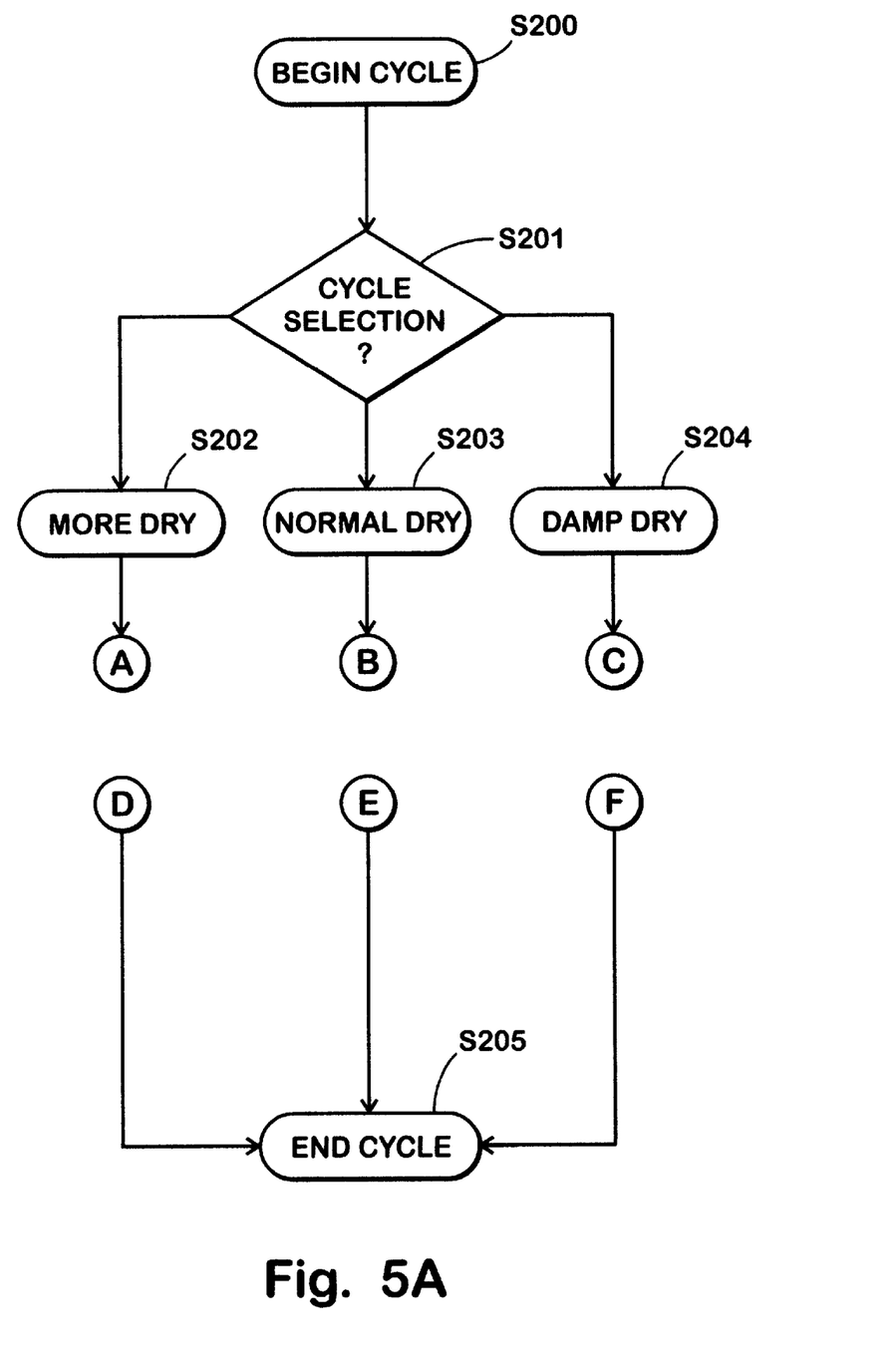
FIGS. 5A through 5D illustrate a flow diagram illustrating the control steps according to another embodiment of the present invention.
Figure 5B:
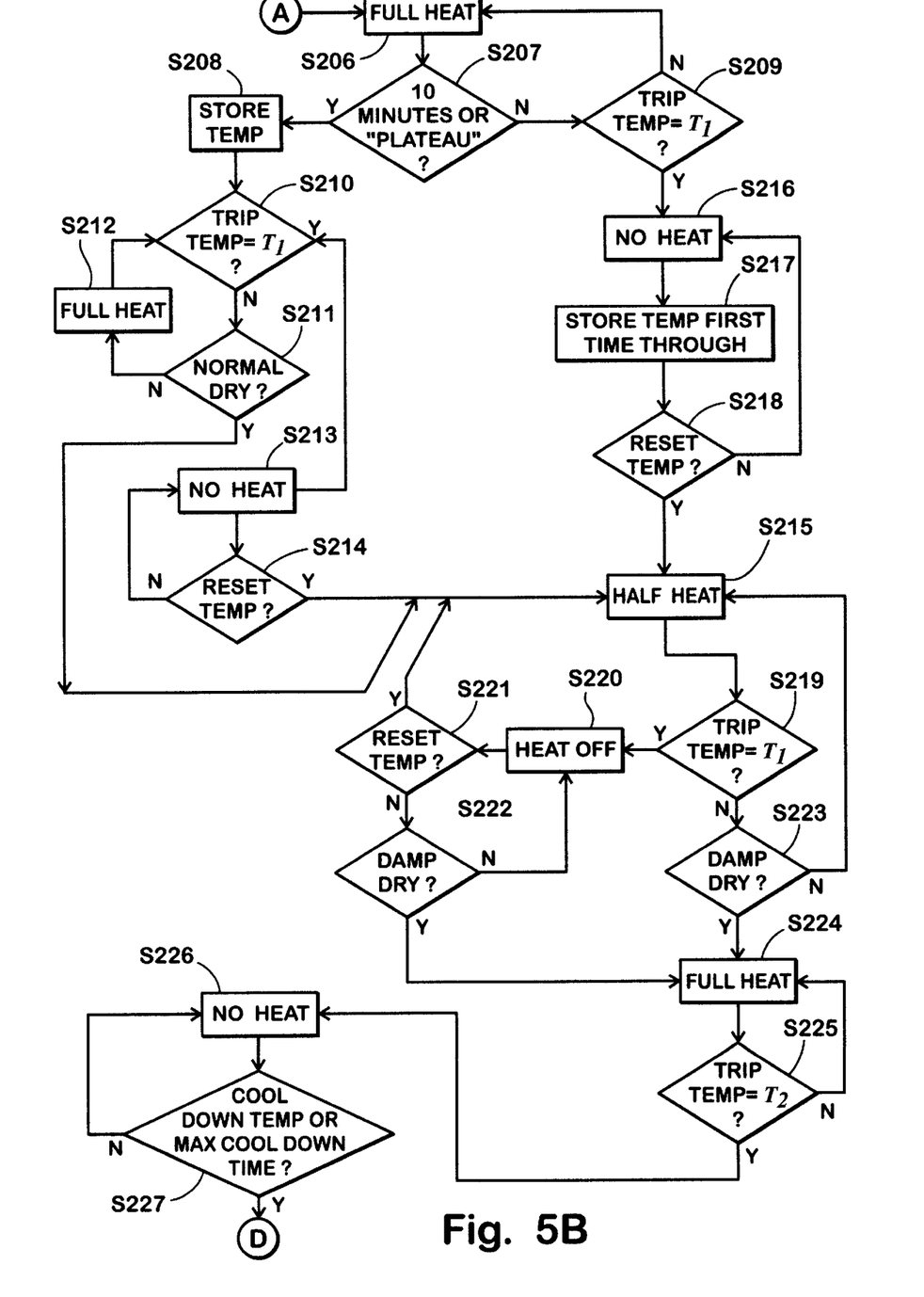

After selection of "more dry", full heat is applied as shown in step S206. After application of full heat power, the controller 35 continuously monitors whether a period of ten minutes has elapsed or a steady state exhaust temperature or "plateau" has been reached. In order to determine the steady state exhaust temperature, the controller 35 monitors exhaust temperature consecutively for a predetermined period of time and senses whether the temperature lies within a specified range over this predetermined period of time. Thus, when the temperature is substantially non-varying (i.e., falling within the specified range over the predetermined amount of time) the controller designates this as a "plateau".

In addition, the time period of ten minutes is based on experiential knowledge of the time period needed to bring a clothes load up to sufficient temperature to begin removal of moisture from the clothes load. However, this time period could be either shorter or longer.

If neither the prescribed time period nor a steady state temperature has been reached in step S207, flow proceeds to step S209 where the controller 35 monitors whether a safety trip temperature $T_1$ has been reached. This temperature is a maximum temperature above which the clothes load becomes overheated. If the trip temperature $T_1$ has not been reached, the flow loops back to step S207.

When the prescribed time period over a steady state temperature has been reached as determined in step S207, the present temperature is then stored by the controller 35 as shown in step S208. The temperature is then once again monitored to determine whether the exhaust temperature has reached trip temperature $T_1$ in step S210. If the trip temperature $T_1$ has not been reached, the controller, as a safety check, queries whether a "normal dry" setting was subsequently entered by the operator as shown in step S211. If this setting was not entered, full heat continues to be applied as shown in step S212 and flow loops back to step S210. Again, if a "normal dry" criterion was selected by the operator, the flow proceeds to step S215 where half heating power is applied to the heating element 34.

On the other hand, if the "full heat" criterion continues to be selected by the operator, the exhaust temperature will continue to be allowed to rise up to trip temperature $T_1$, at which point flow proceeds from step S210 to step S213 for termination of power to the heating element. The controller 35 then monitors the exhaust temperature to determine whether a predetermined reset temperature has been reached. This reset temperature is a temperature lower than trip temperature $T_1$ and is indicative of sufficient cooling within the clothes treatment chamber to avoid an overheating condition. When the reset temperature is reached in step S214, half heating power is applied to the heating element 34 at step S215.

If the trip temperature $T_1$ is reached prior to the prescribed ten minutes or steady state temperature condition, as determined in step S209, the power to the heating element is terminated as shown in step S216. Immediately afterward, the current exhaust temperature is stored by the controller 35 during the first instance in which the algorithm reaches step S217. The controller 35 then monitors whether the predetermined reset temperature has been reached in step S218. If not, flow loops back to step S216 and consequently step S217 wherein the current temperature is not stored again since this is the "second time through". When the exhaust temperature has cooled to the reset temperature, half heat is then applied as shown in step S215.

After the application of half heating power to the heating element 34, the controller 35 continues to monitor whether the safety trip temperature $T_1$ has been reached as shown in step S219. If not, the load moisture is monitored by sensor 52 to determine whether a "damp dry" condition has been reached. This damp dry condition corresponds to approximately 20% load moisture level, below which the sensor 52 can no longer accurately monitor the moisture level. If the damp dry condition is not reached flow loops back to step S215.

If the trip temperature $T_1$ has been reached, as determined in step S219, the heating power is terminated as shown in step S220. If after termination of heating power the predetermined reset temperature is reached, as determined in step S221, half heating power is then reapplied to the heating element 34 as indicated by the procession of flow from step S221 to S215 shown in FIG. 5B. However, if after termination of heat in step S220 the temperature has not reduced to the reset temperature, the controller 35 then proceeds to step S222 to determine whether or not a damp dry condition has been reached. If not, flow proceeds back to step S220 and the controller 35 once again checks whether the temperature has reduced to the reset temperature. If, on the other hand, the controller determines at step S222 that the moisture level of the clothes load has been reduced below the damp dry or approximately 20% load moisture level, the controller 35 once again applies full heat as shown in step S224. Similarly, in step S223, when the damp dry level has been reached flow proceeds to step S224 for application of full heating power.

At this point in the algorithm, the controller 35 continuously monitors the exhaust temperature to determine whether or not a trip temperature $T_2$ has been exceeded. The trip temperature $T_2$ is determined in the controller 35 by adding a predetermined temperature amount to the temperature value previously stored in either of steps S208 or S217. The addition of the predetermined amount allows the dryer temperature to be increased over the initial full heat drying temperature to ensure removal of the remaining moisture in the clothes load. When the trip temperature $T_2$ is reached, as determined in step S225, heating power is terminated to the heating element 34 as shown in step S226 and the controller 35 monitors to determine whether a cool down temperature or a maximum cool down time has been reached. When either of these conditions has been reached, flow proceeds back to step S205, shown in FIG. 5A, to end the drying cycle.

Figure 5C:
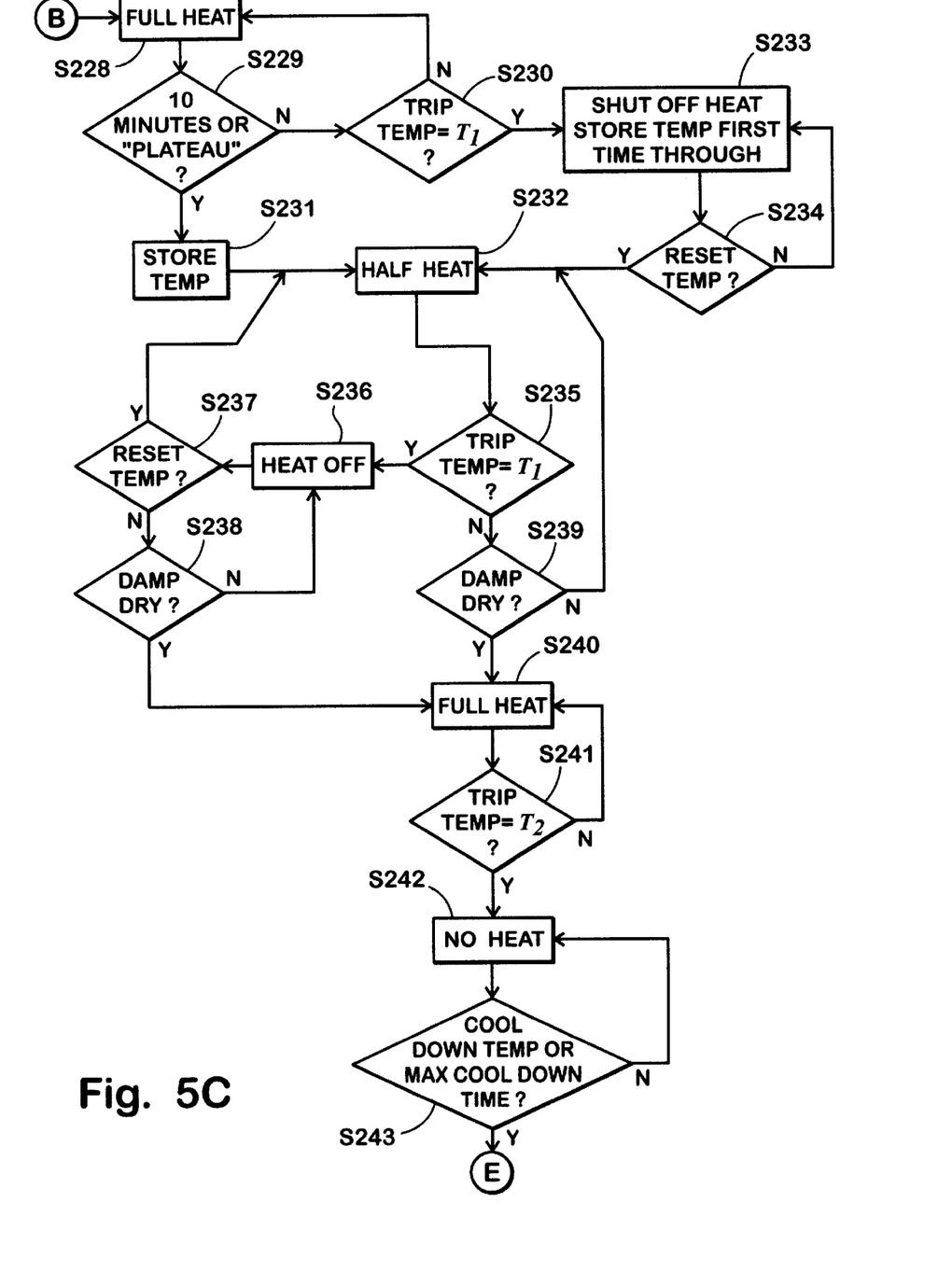

Alternatively, if a "normal dry" criteria is selected in step S201, flow proceeds to step S203 for the start of a normal dry cycle, which is continued in FIG. 5C. At the start of the drying cycle, full heat is applied to the clothes load as shown in step S228. Similar to the "more dry" criteria, the controller 35 monitors whether a predetermined time period or a steady state temperature condition has been reached as shown in step S229. If neither of these conditions as been reached, the controller 35 monitors the exhaust temperature to determine whether the trip temperature $T_1$ has been exceeded. If temperature $T_1$ has not been reached, as determined in step S230, flow loops back to steps S228 and S229 to continue monitoring whether the prescribed time period or steady state condition has been reached. On the other hand, if the trip temperature $T_1$ has been reached, the heating power to the heating element 34 is terminated and the current exhaust temperature is immediately stored during the first instance that the algorithm encounters step S233. The controller 35 then monitors whether the exhaust temperature has cooled to the reset temperature as shown in step S234. If not, flow loops back through step S233 until the exhaust temperature has cooled to the reset temperature. When sufficient cooling down to the reset temperature has occurred, the controller 35 applies half power to the heating element 34 as shown in step S232.

Alternatively, if either the prescribed time period or steady state condition occurs before reaching the trip temperature $T_1$, the controller then proceeds to store the current temperature in step S231 and subsequently apply half heating power to the heating element 234 in shown in step S232. After the application of half heat in step S232, the controller 34 proceed to effect steps S235 through S243 which are identical to steps S219 through S227 previously described with respect to FIG. 5B.

Figure 5D:
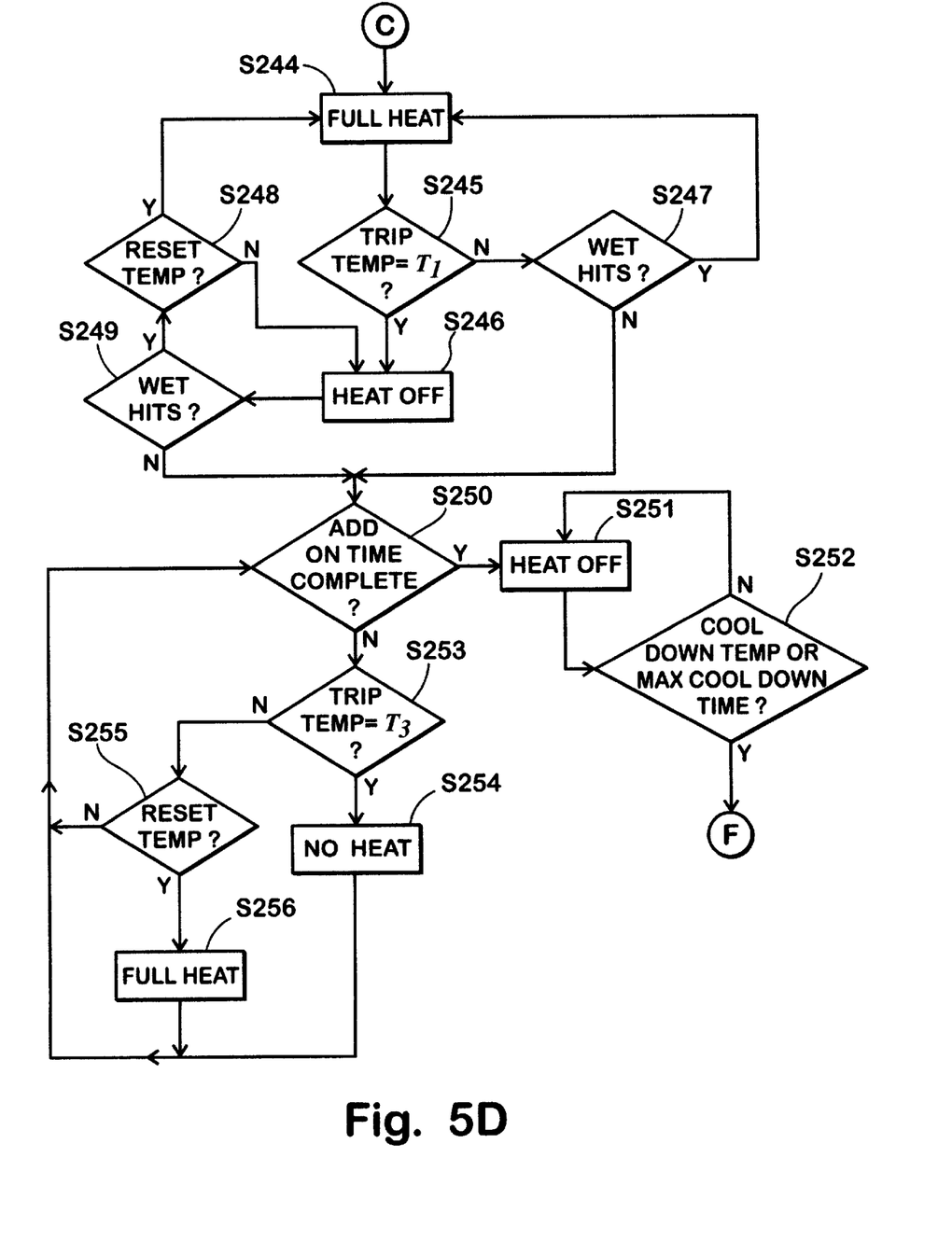

Finally, if the "damp dry" criterion is selected in step S201 as shown in FIG. 5A, flow proceeds from step S204 to step S244 shown in FIG. 5D. At step S244, full heat is applied to the clothes load. The controller 35 then monitors to determine whether or not the trip temperature $T_1$ has been reached. If the trip temperature $T_1$ has been reached, the power to the heating element 34 is terminated in step S246 and the controller proceeds to monitor the load moisture level.

As shown in step S249, the controller 35 monitors whether the load moisture sensor 52 continues to register "wet hits", corresponding to a predetermined load moisture level above the damp dry level of 20% moisture content. If the load moisture sensor 52 continues to register wet hits as determined in step S249, the controller 35 then monitors whether the exhaust temperature has cooled down to the reset temperature level in step S248. If the reset temperature has not been reached, heating power is continued to be turned off and the controller 35 once again monitors whether any wet hits have been registered in step S249. If, on the other hand, in step S248, the reset temperature has been reached, low heating power is again applied to the heating element 34 as shown in step S234.

If, after termination in heat in step S246, no wet hits continue to be registered, as determined in step S249, the controller 35 proceeds to step S250 for determination of whether an add on time has been completed. This predetermined add on time is an additional period of time necessary to remove additional moisture to the "damp dry" level.

If, in step S245, the trip temperature $T_1$ has been not reached, flow proceeds to step S247 to determine whether any wet hits are registered by the load moisture sensor 52. If wet hits continue to be registered, full heating power continues to be applied to the clothes load. However, when no further hits are registered in step S247, the flow proceeds to step S250 to determine whether the add on time has been completed.

When the controller 35 determines that the add on time has not been completed in step S250, the exhaust temperature is monitored to determine whether a trip temperature $T_3$ has been exceeded, as shown in step S253. The trip temperature $T_3$ according to the "damp dry" criterion is a predetermined temperature that is greater than the reset temperature and trip temperature $T_1$.

When the trip temperature $T_3$ has been reached as determined in step S253, the heating power to the heating element 34 is terminated as shown in step S254 and the controller 35 once again determines whether or not the add on time has been completed in step S250. If, on the other hand, the trip temperature $T_3$ has not been reached, flow proceeds to step S255 to determine whether the reset temperature has been reached. If the exhaust temperature has reduced to the reset temperature, full heat is once again applied in step S256 and the controller 35 loops back to determine whether the add on time has been completed in step S250. If the exhaust temperature has not reduced to the reset temperature as determined in step S255, the flow proceeds back to step S250 to determine whether or not the add on time has been completed.

When the add on time has been completed, all heating power is terminated as shown in step S251 and the flow proceeds in steps S251 and S252 identical to steps S226 and S227 previously described with respect to FIG. 5B. Once the cool down temperature or maximum cool down time has been reached as determined in step S252, flow proceeds back to step S205 for termination of the drying cycle.

The dryer heat control of the present invention is advantageous in that power consumption and, hence, energy savings are afforded by reducing power input to the heating element after an initial period of full power heating. Additionally, the dryer control affords efficacious and linear moisture reduction with reduced power consumption. Furthermore, the control of the present invention also provides features at no extra manufacturing cost since it is included as additional programming steps within an existing dryer controller. It will be appreciated by those skilled in the art that the circuitry, techniques and described above for controlling a dryer may be used in whole or in part to control other types of heaters or to control devices other than clothing dryers.

The above provides a detailed description of the best mode contemplated for carrying out the present invention at the time of filing the present application by the inventors thereof. It will be appreciated by those skilled in the art that many modifications and variations, which are included within the intended scope of the claims, may be made without departing from the spirit of the invention. For example, the invention may be implemented in a gas as well as an electric dryer.

What is claimed is:

1. A method for controlling heat input to a dryer comprising the steps of:

setting the heat input to a first prescribed level at a start of a drying cycle;

monitoring dryer temperature and dryer load moisture level;

setting the heat input to a second prescribed level lower than the first prescribed level when the dryer temperature reaches a substantially non-varying temperature level;

increasing the heat input to a third prescribed level when the dryer load moisture level falls below a predetermined dryer load moisture level; and terminating heat input to the dryer according to at least one a plurality of predetermined termination conditions.

2. The method according to claim 1, wherein the first prescribed level is a full power level.

3. The method according to claim 1, wherein the second prescribed level is a half-power level.

4. The method according to claim 1, wherein the second prescribed level is a quarter power level.

5. The method according to claim 1, wherein the third prescribed level is a full power level.

6. The method according to claim 1, wherein one of the plurality of predetermined termination conditions includes monitoring an exhaust temperature of the dryer, determining when the exhaust temperature exceeds a predetermined maximum exhaust temperature level and terminating heat input when the exhaust temperature is determined to have exceeded the predetermined maximum exhaust temperature level.

7. The method according to claim 1, wherein one of the plurality of predetermined termination conditions includes monitoring an exhaust temperature of the dryer, determining when an change in the exhaust temperature per unit time exceeds a predetermined maximum and terminating heat input when the change in the exhaust temperature per unit time exceeds the predetermined maximum.

8. The method according to claim 1, wherein one of the plurality of predetermined termination conditions includes monitoring a run time of the dryer, determining when the elapsed run time exceeds a predetermined maximum run time and terminating heat input when the elapsed run time exceeds the predetermined maximum run time.

9. The method according to claim 1, wherein one of the plurality of predetermined termination conditions includes monitoring whether a set maximum temperature selected by an operator has been exceeded and terminating heat input when the set maximum temperature selected has been exceeded.

10. The method according to claim 1, further comprising the step of:

initiating a cool down cycle after the termination of the heat input wherein a drying chamber within the dryer continues to rotate, the cool down cycle running for a prescribed period of time.

11. The method according to claim 1, further comprising the step of:

storing a monitored dryer temperature at a prescribed time period after the start of the drying cycle; and wherein one of the plurality of predetermined termination conditions includes monitoring an exhaust temperature of the dryer when the heat input has been increased to the third prescribed level, comparing the monitored exhaust temperature to the sum of the stored monitored dryer temperature and a predetermined offset amount and terminating heat input when the monitored exhaust temperature exceeds the sum of the stored monitored dryer temperature and the predetermined offset amount.

12. A method for controlling heating in a clothes dryer comprising the steps of:

selecting a drying level of the dryer according to at least one of a plurality of prescribed drying criteria at a start of a drying cycle;

setting a dryer heating power level to a first prescribed power level during the start of the drying cycle;

determining, according to the selected at least one of the plurality of prescribed drying criteria, when at least one of a temperature of the dryer reaches a substantially non-varying temperature level, an elapsed time from the start of the drying cycle exceeds a first predetermined time amount and the temperature of the dryer reaches a first predetermined temperature level;

storing a current temperature of the dryer when at least one of the temperature of the dryer reaches the substantially non-varying temperature level, the elapsed time from the start of the drying cycle exceeds the first predetermined time amount and the temperature of the dryer reaches the first predetermined temperature level;

terminating heat input when the temperature of the dryer reaches the first predetermined temperature level;

setting the dryer heating power level to a second prescribed power level lower than the first prescribed power level when at least one of the temperature of the dryer reaches the substantially non-varying temperature level, the elapsed time from the start of the drying cycle exceeds the first predetermined time amount and the temperature of the dryer reduces to a second predetermined temperature lower than the first predetermined temperature when the heat input has been terminated due to the temperature of the dryer having reached the first predetermined temperature level;

determining when a moisture level of the dryer falls below a prescribed moisture level;

setting the dryer heating power level to the first prescribed power level when the moisture level of the dryer falls below the prescribed moisture level and establishing a second predetermined temperature level by at least one of setting the second predetermined temperature level equal to a pre-stored temperature value according to at least one of the plurality of prescribed drying criteria and setting the second predetermined temperature level equal to the sum of a predetermined addition value and the stored current temperature resulting in a second predetermined temperature level according to at least one other of the plurality of prescribed drying criteria; and terminating heat input to the dryer when the dryer temperature exceeds the second predetermined temperature.

* * * * *